United States Patent Office 3,730,736
Patented May 1, 1973

3,730,736
LOW CALORIE SWEETENER
Alfred R. Globus, Bayside, N.Y., assignor to Farah Manufacturing Co., Inc., El Paso, Tex., and Guardian Chemical Corporation, Hauppage, Long Island, N.Y.
No Drawing. Filed June 12, 1970, Ser. No. 45,925
Int. Cl. A23l 1/26
U.S. Cl. 99—141 A                 7 Claims

ABSTRACT OF THE DISCLOSURE

Low calorie sweetener prepared by the steps of reacting a metal salt of saccharin with a non-toxic acid in the presence of an emulsifying agent comprising water, glycerin and glycerol monostearate, adding a non-toxic polyphosphate to the resultant emulsion of the reaction product formed in the reaction as a stabilizer therefor, and admixing the emulsion with a carrier such as an amino acid or glucono delta lactone. The resultant powder constitutes the low calorie sweetener.

---

This invention relates to novel low calorie sweeteners and particularly to such sweeteners having a sweetness seven times that of sucrose and having substantially no food value.

Low calorie sweeteners are well known in the art. Until recently, the cyclamates (cyclohexane sulfamic acid) and particularly calcium cyclamate and sodium cyclamate had been used extensively as non-nutritive sweetening agents. These compounds were characteriized by their pleasant, very sweet taste, solubility in water and absence of any after taste. Unfortunately excessive intake was found to produce cancer in laboratory animals and their use is no longer permitted. Saccharin (2,3-dihydro-3-oxybenzisosulfinazole) has also been used as a non-caloric sweetening agent. The imide while having the desired sweetening power is only slightly soluble in water. The imide is converted to the sodium salt to increase the solubiltiy in water. However, unlike the cyclamates, the soluble saccharin, i.e., the sodium salt is characterized by an unpleasant after taste. It has been established that this after taste is due to the water soluble hydrolysis products of the saccharin sodium.

It is an object of this invention, therefore, to provide new compositions of matter constituting non-nutritive sweetening agents.

It is another object to provide new non-nutritive sweetening agents which are highly soluble in water, non-toxic and free of any undesirable after taste.

Other objects and advantages of the present invention will become apparent to those skilled in the art from the following description.

The foregoing objects are realized with new low calorie sweetening agents comprising the products produced by the steps of (1) Reacting a salt of saccharin with a fairly strong non-toxic acid in the presence of an aqueous emulsifying agent, (2) Introducing into the emulsion thereby formed and containing the saccharin and the acid salt formed in the reaction, a non-toxic polyphosphate as stabilizer for the emulsion, (3) Admixing the stabilized emulsion with a solid food grade carrier to form a homogeneous powder which is non-nutritive, at least seven times as sweet as sucrose and characterized by the absence of any after taste.

The compositions of this invention must contain four components, namely
(1) An emulsifying agent,
(2) Saccharin formed in the presence of the emulsifying agent by reaction of the water soluble saccharin salt and a non-toxic acid,
(3) A stabilizer for the emulsion, and
(4) A food grade carrier for the emulsion.

The first component is formed by mixing the water, glycerin and a non-ionic surface active agent, i.e., complex esters or ester-ethers whose chemical starting points are hexahydric alcohols, alkylene oxides and fatty acids. The hydrophile character is supplied by the free hydroxyl groups and the oxyethylene groups while the liophile portion is found in the long chain fatty acids. Such latter surface active agents are conventionally known as Span type materials and Tween type materials. The Span type materials are partial esters of the common fatty acids (lauric, palmitic, stearic and oleic) and hexitol anhydrides (hexitans and hexides) derived from sorbitol.

The Tween type materials are derived from the Span products by adding polyoxyethylene chains to the nonesterified hydroxyls.

Tween 80 or polysorbate 80 which is polyoxyethylene sorbitan monooleate and the partial ester of glycerol and stearic acid, for instance, glycerol monostearate are illustrations of particularly preferred agents for use in preparing the first component.

The first component is prepared by mixing together a minor amount of water with comparatively larger amounts of both the glycerin and the surface active agent.

The second component constitutes the active or sweetening ingredient and is prepared in situ by reacting a metal salt of saccharin such as a sodium, potassium or calcium salt of saccharin with at least the stoichiometric-calcium salt of saccharin with at least the stoichiometrically necessary amount and preferably an excess of a fairly strong non-toxic acid such as tartaric acid, citric acid, malic acid, gluconic acid and the like. The acid as employed in the reaction should be a solid. It is also possible to use as the acid component a compound which gives rise to the acid in the presence of water as for instance glucono delta lactone which forms gluconic acid in the presence of water. The preferred acid is citric acid.

The saccharin salt for instance saccharin sodium is reacted with the acid, for instance, citric acid by introducing both of these compounds into the first component, there being formed a thick syrup containing therein the acid salt, i.e., sodium citrate and free saccharin in a highly emulsified state. This thick syrup is colorless and highly water soluble.

The third component is a food grade polyphosphate, as for example, potassium polyphosphate and serves as a stabilizer for the emulsion. The polyphosphate can be prepared from phospholeum, i.e., tetraphosphoric acid, tripolyphosphoric acid or other polyphosphoric acids having $P_2O_5$ contents of about 82–85%. More specifically, the metal polyphosphate can be derived from polymeric phosphorated oxygen derivatives such as pyrophosphoric acid, orthophosphoric acid and metaphosphoric acid. Generally preferred are the polyphosphates of sodium, potassium and the like which are highly soluble in water. Of course the polyphosphate must be suitable for dietary use, i.e., it must be of food grade.

The fourth component is a carrier and as employed herein is an amino acid such as glycine, alanine, aspartic acid, lycine and the like or a mixture thereof. There can also be used as carrier, glucono delta lactone or sorbitol. It is necessary only that the amino acid or other compound selected for use as carrier be a solid, freely soluble in water and non-toxic in the amounts involved.

The novel non-nutritive sweetening agents of the invention are prepared by the procedure as hereinafter set out.

In general the first component is prepared first by mixing a small amount of water with relatively large amounts of glycerin and the surface active agent as has been set out above. The second component comprising a dry mixture of soluble saccharin and food grade solid acid is then added to the first component or vice versa. As noted above, a thick syrup is formed containing in a highly emulsified state the products of the reaction and namely saccharin and the acid salt. The polyphosphate is then incorporated into the syrup. The introduction of the solid polyphosphate may bring about a gelling and/or hardening of the emulsion. If this takes place, it is necessary that the gell be broken up before the carrier is added. This may even require that the hardened gel be subjected to grinding.

The fourth and final component, the carrier, is then added. The important feature here is that sufficient mixing should be utilized by working, grinding, homogenizing, or otherwise to secure a complete and thorough dispersion of the semifinished product formed from the first three components throughout the carrier and thereafter the formation of a unitary material inseparable into its components without further treatment. The final product is required to be a dry powder. If the composition obtained following incorporation of the carrier is not entirely dry, the working, i.e., grinding can be carried out under warm air.

The composition of the invention is a white powder similar in appearance to flour and/or confectionary sugar. In some instances, it may be semicrystalline in nature and resemble crystalline sugar more closely than powdered sugar. It is not particularly hygroscopic and is highly soluble in water.

Preferably the compositions are formulated as follows:

|  | Percent |
|---|---|
| Sodium saccharin | 2 |
| Acid | 5–6 |
| Emulsifying component | 4–6 |
| Polyphosphate | 8 |
| Carrier | 78–81 |

An outstanding low calorie sweetening composition of this invention has been formed in the manner described in Example 1.

EXAMPLE 1

|  | Amount, percent |
|---|---|
| Sodium saccharin | 2.0 |
| Citric acid | 5.0 |
| Water | 1.0 |
| Glycerin | 2.0 |
| Glycerol monostearate | 2.0 |
| Potassium polyphosphate | 8.0 |
| Glycine or sorbitol | Balance |

The water, glycerin and glycerol monostearate were mixed together. Thereafter the sodium saccharin and citric acid were introduced into the water - glycerin - glycerol monostearate mixture and allowed to react therein in the cold. The potassium polyphosphate was introduced into the resultant thick syrup. The syrup thereupon underwent gelling and hardening. The hardened material was broken up by grinding and in the ground form added to the glycine. This mixture was homogenized by further grinding, the grinding being continued until a unitary powder form material was obtained.

The product of Example 1 was tested for after taste by being offered to a large number of subjects in a form of a sweetening agent in coffee, soft drinks, jams, jellies, gelatins and ice cream. In complete contrast to the same products in which sodium saccharin had been used as the sweetining agent, in no instance was any after taste reported for the products containing the sweetening composition of the invention.

The ammonium salt of glycyrrhizic acid was substituted for the sodium saccharin and substantially the same results were obtained.

The sweetening compositions of the invention are seven times as sweet as commercial sugar (sucrose) and eight times as sweet as fructose. They contain 2.4 calories/gram. These calories are not, however, derived from carbonhydrate. The compositions constitute non-caloric sweetening agents having substantially no food value and are highly satisfactory for use when it is desirable or necessary to reduce the consumption of sugar.

What is claimed is:

1. A method of preparing a low calorie sweetening agent comprising the steps of reacting a metal salt of saccharin with a non-toxic acid in the presence of an emulsifying agent comprising a minor amount of water and comparatively large amounts of glycerin and a non-ionic surface active agent selected from the group consisting of complex esters and ester-ethers whose chemical starting points are hexahydric alcohols, alkylene oxides and fatty acids, introducing a non-toxic water soluble polyphosphate as stabilizer for the resultant emulsion and thoroughly admixing the stabilized emulsion with a carrier selected from the group consisting of amino acids, sorbitol and glucono delta lactone.

2. Method according to claim 1 wherein said metal salt of saccharin is a member selected from the group consisting of sodium, potassium and calcium saccharin.

3. Method according to claim 1 wherein said non-toxic acid is a member selected from the group consisting of tartaric, citric, malic and gluconic acid.

4. Method according to claim 1 wherein said emulsifying agent contains a partial ester of a fatty acid selected from the group consisting of lauric, palmitic, stearic and oleic acids and a hexitol anhydride derived from sorbitol.

5. Method according to claim 1 wherein said polyphosphate is potassium polyphosphate.

6. Method according to claim 1 wherein said amino acid is at least one member selected from the group consisting of glycine, alanine, lysine and aspartic acid.

7. Method according to claim 1 wherein said carrier is glycine.

References Cited

UNITED STATES PATENTS

| 2,803,551 | 8/1957 | Helgren | 99—141 |
| 2,845,353 | 7/1958 | Riffkin | 99—141 |
| 3,105,792 | 10/1963 | White | 167—57 |

RAYMOND N. JONES, Primary Examiner

R. B. ANDEWELT, Assistant Examiner